(12) United States Patent
Vogelman

(10) Patent No.: US 7,584,721 B2
(45) Date of Patent: Sep. 8, 2009

(54) DISPOSABLE BOOTIE FOR PETS

(75) Inventor: Rod Vogelman, San Diego, CA (US)

(73) Assignee: Rotano International, Chula Vista, CA (US)

( * ) Notice: Subject to any disclaimer, the term of this patent is extended or adjusted under 35 U.S.C. 154(b) by 68 days.

(21) Appl. No.: 11/700,531

(22) Filed: Jan. 31, 2007

(65) Prior Publication Data
US 2007/0175410 A1 Aug. 2, 2007

Related U.S. Application Data

(63) Continuation-in-part of application No. 11/652,780, filed on Jan. 12, 2007, now abandoned.

(60) Provisional application No. 60/763,996, filed on Jan. 31, 2006.

(51) Int. Cl.
A61D 9/00 (2006.01)
A43B 7/20 (2006.01)

(52) U.S. Cl. .............. 119/850; 36/111; 36/89

(58) Field of Classification Search ........... 119/850; 54/82, 79.2, 79.3, 79.4; D30/145, 146; 36/111, 36/89, 97, 117.8, 58.6, 7.1 R
See application file for complete search history.

(56) References Cited

U.S. PATENT DOCUMENTS

| | | | | |
|---|---|---|---|---|
| 2,252,315 A * | 8/1941 | Doree | ............... | 36/9 R |
| 2,745,196 A * | 5/1956 | Schneider et al. | ............... | 36/97 |
| 3,735,758 A * | 5/1973 | Novotney | ............... | 602/3 |
| 3,762,073 A | 10/1973 | Cantales | | |
| 3,824,714 A * | 7/1974 | Glassman | ............... | 36/7.1 R |
| 4,543,911 A * | 10/1985 | Marshall | ............... | 54/82 |
| 4,744,333 A | 5/1988 | Taylor | | |
| 4,825,564 A * | 5/1989 | Sorce | ............... | 36/87 |
| 4,918,839 A * | 4/1990 | Brandon | ............... | 36/7.1 R |
| 4,967,542 A | 11/1990 | MacDonald | | |
| 5,148,657 A | 9/1992 | Stafford et al. | | |
| 5,185,000 A * | 2/1993 | Brandt et al. | ............... | 602/63 |
| 5,408,812 A | 4/1995 | Stark | | |
| 5,452,685 A | 9/1995 | Thomas | | |
| 5,495,828 A | 3/1996 | Solomon et al. | | |
| D375,586 S | 11/1996 | Caditz | | |
| D379,251 S | 5/1997 | Mezey | | |
| D382,378 S | 8/1997 | Stark | | |
| D387,511 S | 12/1997 | Caditz | | |
| 5,727,575 A * | 3/1998 | Rontal | ............... | 132/200 |
| 5,787,607 A * | 8/1998 | Schurch | ............... | 36/7.1 R |
| 5,983,526 A * | 11/1999 | Pawlik et al. | ............... | 36/7.1 R |
| D417,530 S | 12/1999 | Danek | | |
| 6,047,403 A * | 4/2000 | Juozaitis | ............... | 2/61 |
| 6,186,097 B1 | 2/2001 | Brockmann et al. | | |

(Continued)

*Primary Examiner*—Yvonne R. Abbott
(74) *Attorney, Agent, or Firm*—Laurie A. Axford; The Nath Law Group

(57) ABSTRACT

A pet bootie is formed by a sleeve of pliable, disposable and liquid impervious material having a closed end for receiving an animal's paw and an open end. A loop of elastic material has an inner end secured to the sleeve at a predetermined distance from the open end of the sleeve and projecting outwardly from the sleeve. The loop is of predetermined extended length for allowing the loop to be extended around the sleeve and the animal's leg when the paw is inserted into the closed end of the sleeve, whereby the sleeve is secured in position.

10 Claims, 7 Drawing Sheets

U.S. PATENT DOCUMENTS

| | | |
|---|---|---|
| 6,470,832 B1 | 10/2002 | Peacock |
| 6,516,469 B1 * | 2/2003 | Schaetzel .................... 2/16 |
| 6,526,920 B1 | 3/2003 | Griffin |
| 6,546,704 B1 | 4/2003 | Fisher |
| 6,727,469 B1 | 4/2004 | Parker et al. |
| 6,851,394 B1 | 2/2005 | Young |
| 6,863,033 B1 | 3/2005 | Fleming |
| D504,324 S | 4/2005 | Hall |
| 6,931,767 B2 | 8/2005 | Royle |
| 2003/0172441 A1 | 9/2003 | Foster et al. |
| 2005/0188925 A1 * | 9/2005 | Yun et al. .................... 119/850 |
| 2006/0042563 A1 | 3/2006 | Galloway et al. |
| 2007/0074677 A1 * | 4/2007 | Behme ....................... 119/850 |

* cited by examiner

DISPOSABLE BOOTIE FOR PETS

CROSS REFERENCE TO RELATED APPLICATION

This application is a continuation-in-part of U.S. patent application Ser. No. 11/652,780 filed Jan. 12, 2007 now abandoned, and claims the benefit of U.S. Provisional Application No. 60/763,996 filed Jan. 31, 2006.

FIELD OF THE INVENTION

The present invention relates generally to protective footwear for dogs or other pets, to provide protection from heat of a pavement or other surface on which the pet is walking, or from rough terrain, wet, dirty or icy surfaces, and the like, and also to protect injured paws or paws on which medication has been applied.

BACKGROUND OF THE INVENTION

Protective booties, socks, or shoes have been proposed for pets such as dogs in the past, both to protect the animal's paws when outdoors, and also to prevent soiling of indoor floors when the animal returns from a walk or the like. The owner simply removes the booties before the animal enters the house. Such footwear is generally non-disposable and must be washed between uses, and is often of a relatively complex and cumbersome nature. For example, U.S. Pat. No. 6,546,704 of Fisher describes a dog boot comprising a planar flexible sheet of material comprising a high friction outer layer, a foam central layer, and a fabric inner layer. The sheet is designed to be wrapped around the leg and foot and snapped together with fastener straps:

U.S. Pat. No. 5,452,685 of Thomas describes a dog bootie comprising a tube of canvas material or the like having a closed bottom end and hook and loop fastening means around the open top. U.S. Pat. No. 5,495,828 of Solomon et al. describes animal boots each comprising a pliable sleeve with a waterproof outer layer and a fabric inner layer, and an adjustable fastening strap secured around the sleeve adjacent the open end by means of hook and loop type fastener material.

One problem in these sleeve-like booties with fastener straps using hook and loop material or buckle-like fasteners is that they may tend to slip off or be pulled off by the dog or other pet. They also can be awkward to fasten around the animal's legs.

To solve these aforementioned problems, the present invention provides a disposable protective bootie having an elastic loop to secure the bootie to the animal's leg. The protective bootie is suitable for both indoor and outdoor use. The protective bootie may be used to protect the animal's paws from unwanted or potentially harmful materials, such as snow, ice, mud, chemicals, or other debris. With a sufficient cushion, the protective bootie may be used to protect the animal from extreme weathers and to provide additional comforts to the animal. Furthermore, the protective bootie may also be used to protect other surfaces such as floors, from getting soiled by the animal. The protective bootie of the present invention is relatively inexpensive, and can readily be modified to suit different size animals and supplied to pet owners in bulk quantities for convenience.

SUMMARY OF THE INVENTION

According to one of the embodiment of the present invention, a protective bootie for an animal is provided, which comprises a sleeve having a lower closed end and an upper open end for receiving the animal's paw, and an elastic loop having an inner end attached to the sleeve at a predetermined distance from the open end of the sleeve and projecting outwardly from the sleeve. The sleeve of the protective bootie has a front and rear panel, which each have a paw section proximate to the lower closed end and a leg section proximate to the upper open end. As used herein, the term "leg section" refers to a section of the panel that is in contact with an ankle, or an ankle and a leg of the animal when in use. The paw section of the rear panel may function as a bootie sole. The leg section of the bootie has an upper end as the upper open end of the protective bootie, and a lower end attached to the paw section.

The elastic loop is adapted to the animal's leg for securing the protective bootie to the animal's leg by looping around the leg at least once. The elastic loop has a predetermined extended length to be adapted to the animal's leg by looping around the leg at least once when the paw is inserted into the closed end of the sleeve, whereby the sleeve is secured in position. The elastic loop may be looped once, twice, or more around the animal's leg, as needed for sufficient gripping force. The elastic loop is much faster and easier to engage about the leg than fastener straps or the like.

In another embodiment, the protective bootie further comprises an elastic strip, which is attached in proximity to the open end of the sleeve for gripping against the animal's leg while the sleeve is in use, for additional security. The elastic strip may be secured on an inner surface of the sleeve opening, so as to engage the animal's leg and fur directly for added slip resistance. Furthermore, the upper open end of the leg section may have a width larger than the lower end that is connected to the paw section of the protective bootie. The length of elastic strip at the upper end of the leg section is selected such that the upper open end of the protective bootie is larger in width than the lower end of the leg section when the elastic strip is fully extended, and is still capable of engaging the animal's leg and fur to provide additional slip resistance when in use. The leg section of the protective bootie may have the shape of a trapezoid with the longer base at the upper open end and the shorter base attached to the paw section.

In yet another embodiment, the protective bootie also comprises an ankle pleat, which is a transverse fold extending between the opposite sides of the rear panel at a location which corresponds approximately to the animal's ankle. The ankle pleat, when the bootie is worn, provides a bend that separates the paw section from the leg section of the sleeve. In this case, the elastic loop may be attached to the leg section of the sleeve, adjacent or just above the ankle pleat.

In still another embodiment, the paw section of the front or rear protective bootie also has at least one secondary layer attached to the interior and/or exterior surface of the paw section. The secondary layer may be a non-skid or non-slip layer that is attached to the exterior surface of the paw section of the rear panel. The non-skid layer can be made of various types of rubberized materials, such as vinyl, latex, neoprene, silicone, and the like, for durability, wear resistance and increased traction on various types of terrain. The non-skid layer may also be textured, such as with a paw print, to provide additional tractions. The secondary layer may function as a cushion or reinforced toe, which is attached to the interior and/or exterior surface of the paw section to provide additional protections and/or comforts for the animal. As such, the thickness of the paw section of the rear panel may be thicker than the leg portion.

In an alternative embodiment, the protective bootie also contains an inner layer that can be impregnated with a fragrance, a pharmaceutical, a moisturizer, or the like. The impregnated material may release the above fragrance, moisturizer, or pharmaceutical through the process of hydration to act as an emollient on the paw pad of the animal.

The sleeve of the protective bootie may be of multiple piece construction. In a two piece construction, for example, the sleeve is formed by a pair of opposing front and rear side walls or panels which are secured together along at least one side edge and the closed lower end of the sleeve. The side walls may be formed by two separate sheets of material of predetermined shape and dimensions joined together by sewing or bonding along their peripheral edges to form the opposite sides and closed end of the sleeve. Alternatively, the sleeve of the protective bootie may be manufactured from a single piece of flexible material. For example, a single sheet of material may be cut to form the opposite side walls and then folded along its center line before being sewn along the opposing free side edges and lower end.

The sleeve is made from a suitably inexpensive, disposable material which has a non-skid or skid-resistant outer surface, and which is substantially waterproof or liquid impervious to protect the animal's paws from getting wet in snow or rain. In certain embodiments, the sleeve was made from a laminate comprising a layer of polyethylene on the outer surface of the bootie and a layer of spun bond polypropylene on the inner surface of the bootie. This material is relatively inexpensive yet is very strong and tear resistant.

The disposable animal booties of this invention provide a quick and convenient means for protecting an animal's paws when leaving the home on walks or the like. The booties protects the paws against both hot and cold surfaces in summer and winter, as well as against snow, ice, mud or the like, and against other materials such as dirt, chemicals, or other debris they may pick up while walking. The booties also protect floor surfaces in the home against soiling by a dog's muddy paws or the like, and can protect injured paws while the animal is walking outdoors or indoors. They can simply be removed and discarded on return to the home. The booties may also be used indoors when a pet has to have medication (e.g., antimicrobials), moisturizer, ointment or the like applied to their pads or elsewhere on the paws. The bootie protects the medication and prevents it from coming off on surfaces where the pet is sitting or walking, and also prevents the animal from licking off the medication, which is a common problem. The booties are relatively inexpensive and can be provided to pet owners in bulk quantities for convenience.

BRIEF DESCRIPTION OF THE DRAWINGS

The present invention is better understood from the following detailed description of an exemplary embodiment of the invention, taken in conjunction with the accompanying drawings, in which like reference numerals refer to like parts, and in which.

DETAILED DESCRIPTION OF THE INVENTION

Figure 5:
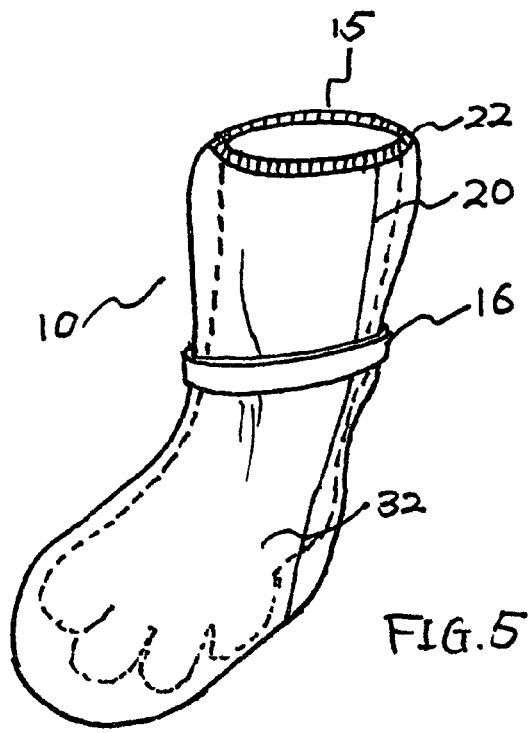
FIG. 5 is a front elevation view illustrating the bootie in use and secured over an animal's paw.
Figure 6:
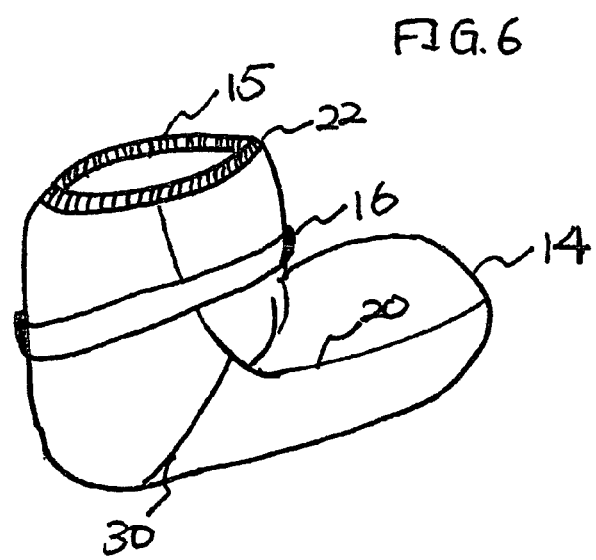
FIG. 6 is a rear elevation view illustrating the bootie in use.
Figure 7:
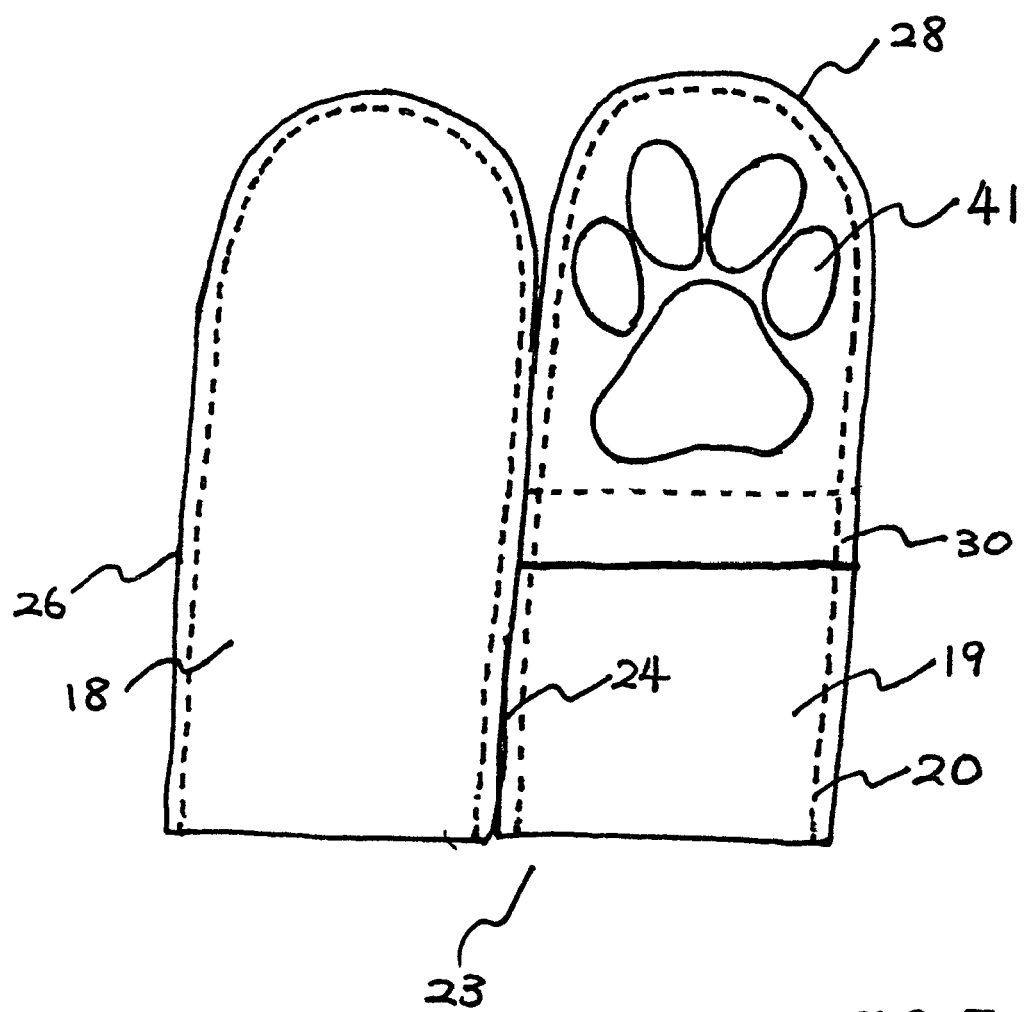
FIG. 7 is a top plan view of a cut out blank of material prior to folding to form the bootie according to an exemplary embodiment of the present invention.

FIGS. 1 to 6 illustrate a disposable animal bootie 10 according to an exemplary embodiment of the present invention, while FIG. 7 illustrates a blank of material which may be used for making the bootie.

The animal bootie 10 basically comprises an elongate sleeve 12 having a rounded, closed end 14 and an open end 15, and a loop 16 of elastic material having an inner end 17 secured to a side seam of the sleeve by stitching or the like, so that the loop projects outwardly from the sleeve when not in use.

Figure 2:
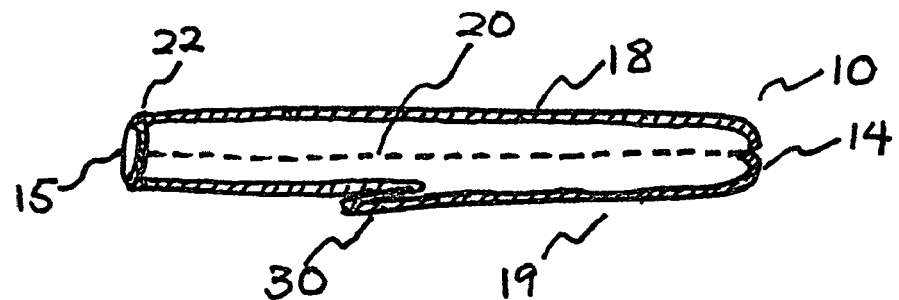
FIG. 2 is a cross-section on the line 1A-1A of FIG. 1.

The sleeve 12 has a front wall 18 and a rear wall 19 secured together along their peripheral side edges and lower end edges by stitching to form seam 20, as generally indicated in FIG. 2, and then turned inside out so that the stitching is concealed on the inside of the bootie. A strip 22 of elastic or rubberized material is secured around the open end 15 of the sleeve and has a length smaller than the circumference of the open end of the sleeve, so that the opening is gathered or drawn inwardly, as indicated in the drawings. The strip 22 is sewn along the upper ends of the sheets of material forming the front and rear walls before folding them together and sewing the final side seam.

FIG. 7 illustrates a suitable blank 23 for forming the sleeve 12. This may be formed by cutting two separate sheets of appropriate shape and dimension for forming the front and rear walls 18, 19, or a single sheet may be cut to the illustrated shape and then folded along the central seam or fold line 24 to form the sleeve. This reduces the amount of stitching required and therefore the cost of manufacture. If formed from two separate sheets, the sheets is first sewn together along central seam 24, and then the strip 22 of elastic is sewn across the upper edges of the connected sheets on the side which corresponds to the inner surface of the sleeve, as indicated in dotted lines. The sheets is then folded together along central seam 24 and sewn together along the aligned side edges 26 and lower end edges 28. In an exemplary embodiment, a transverse fold 30 is formed across the width of the sheet which comprises the rear wall 19 of the finished sleeve. The fold is located at a position which is adjacent the ankle of the animal when the sleeve is in use, so that a bend or joint is formed at this location, separating a paw portion of the sleeve from a leg engaging portion of the sleeve, as can be seen in FIGS. 5 and 6.

Figure 1:
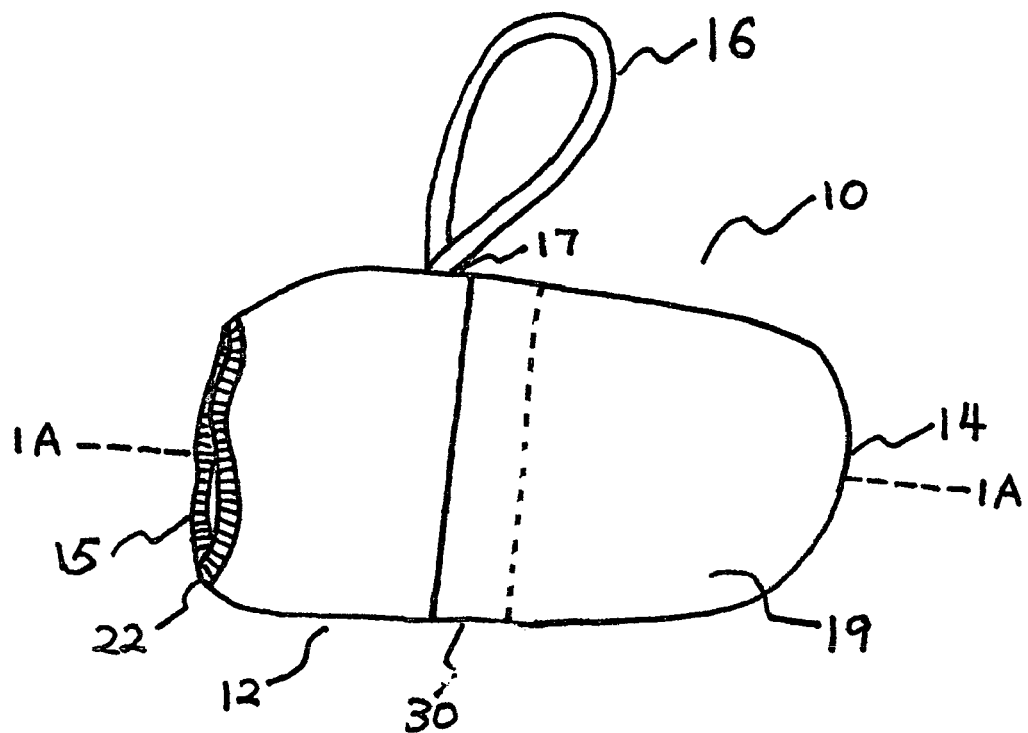
FIG. 1 is a bottom plan view of an animal bootie according to an exemplary embodiment of the invention.
Figure 3:
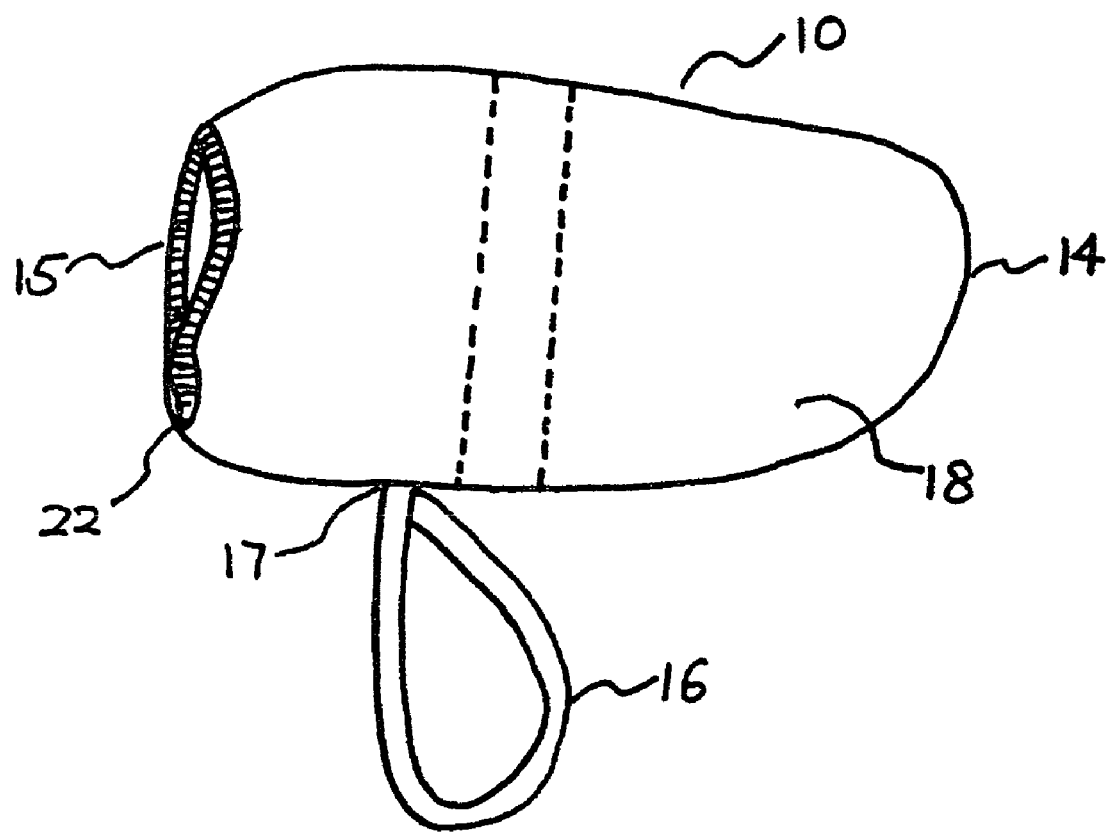
FIG. 3 is a top plan view of the animal bootie of FIG. 1.

Elastic loop 16 is formed from a strip of elastic material, which may be a nylon covered, braided elastic or equivalent, and is a stronger elastic material than the elastic strip 22 around the open end of the sleeve. Both the strip forming loop 16 and the strip 22 may be of the order of ⅛ to ⅜ inches in width. The ends of the strip or band forming the loop 16 are sewn into one of the side seams of the sleeve so that the loop projects outwardly when the bootie is not in use, as best illustrated in FIGS. 1 and 3.

Loop 16 is located relatively close to fold 30, as indicated, and between the fold and the open upper end 15 of the sleeve. In an exemplary embodiment, loop 16 is located at a point which is approximately one third of the distance from the open end 15 to the closed end of the sleeve, and the fold 30 may be located one third to one half of the distance from the open end 15 to the closed end. Ideally, the elastic loop 16 is located just above the animal's paw when the bootie is worn, adjacent the ankle, and the fold 30 is located at the ankle. Although the bootie extends several inches up the animal's leg from loop 16 in the illustrated embodiment, it may be made shorter in alternative embodiments, with the open end located only an inch or so above the elastic loop 16 to provide a gripping area for loop 16. In this case, the elastic strip 22 around the open upper end of the sleeve may be eliminated.

Figure 4:
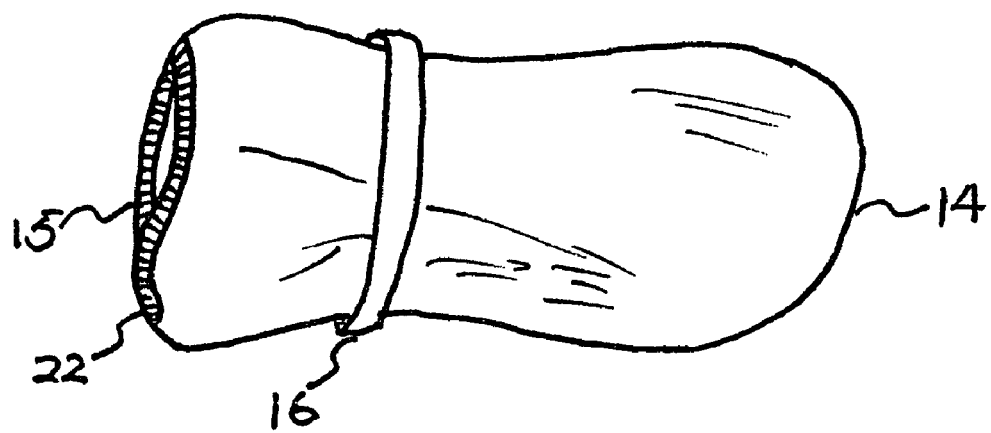
FIG. 4 is a top plan view similar to FIG. 3 showing the elastic loop secured around the bootie.

FIGS. 5 to 6 illustrate use of the booties to protect an animal's paws 32. When the animal, such as a dog, is going outdoors for a walk or the like, the owner simply pulls a bootie 10 over each paw. The elastic strip 22 around the open end grips against the animal's leg to hold the bootie in place while the owner stretches loop 16 and pulls it over the paw so that it engages around the sleeve 12 and enclosed leg, as indicated in FIGS. 4 to 6. The elastic strip 22 is exposed on the inner side of the opening 15, so that it can grip against the animal's leg or fur, so that there are fewer tendencies for the bootie to slip down prior to application of the securing loop 16. If necessary, depending on the circumference of the animal's leg, the loop 16 can be looped around the sleeve and leg more than once, until a sufficiently tight yet comfortable fit is achieved. The booties can be secured over all four paws of an animal relatively quickly, with the upper elastic 22 holding them in position while the loops 16 are engaged around the respective sleeves. The bootie is quite comfortable for the animal so that they are less likely to try to bite or scratch them off.

The protective booties of this invention is be made in a range of sizes depending on the size and type of animal. Table 1 below is an example of a range of different sizes for different breeds of dog. The dimensions are such that the bootie is always extending above the ankle joint of the dog.

It can be seen that the securing loop or band 16 has an extended length which is around double the relaxed length, which is sufficient for extending the loop around the animal's paw and the sleeve, into the operative position illustrated in FIGS. 4 to 6.

Figure 8:
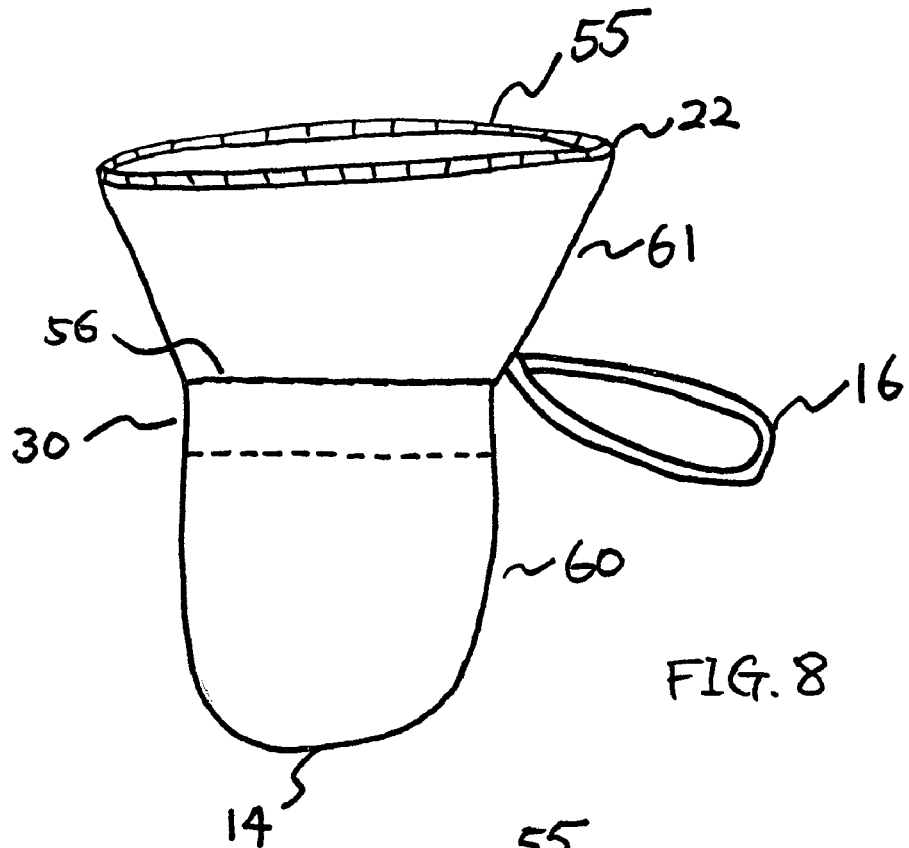
FIG. 8 is a bottom plan view of an animal bootie according to an alternative exemplary embodiment of the invention, when the elastic strip is fully extended.
Figure 9:
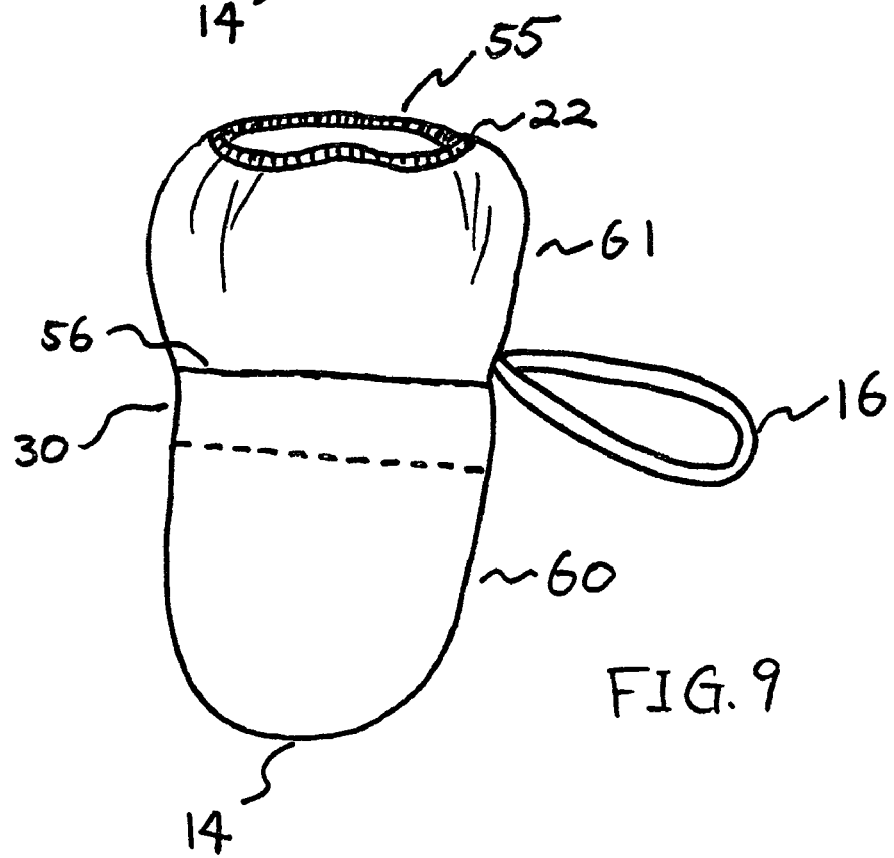
FIG. 9 is a bottom plan view similar to FIG. 8 with the elastic strip fully relaxed.

FIGS. 8 and 9 illustrate a protective bootie 10 according to an alternative embodiment of the present invention. The upper open end 55 of the leg section 61 has a width larger than the lower end 56 that is connected to the paw section 60 of the protective bootie 10. The length of elastic strip 22 is selected as such that the upper open end 55 is larger in width than the lower end of the leg section when the elastic strip 22 is fully extended, but is still capable of engaging the animal's leg and fur to provide additional slip resistance when in use. As shown in FIG. 8, in the fully extended state, the leg section 61 of the protective bootie 10 is in the shape of a trapezoid with the longer base at the upper open end 55 and the shorter base 56 connected to the paw section 60 around the ankle pleat.

Figure 10:
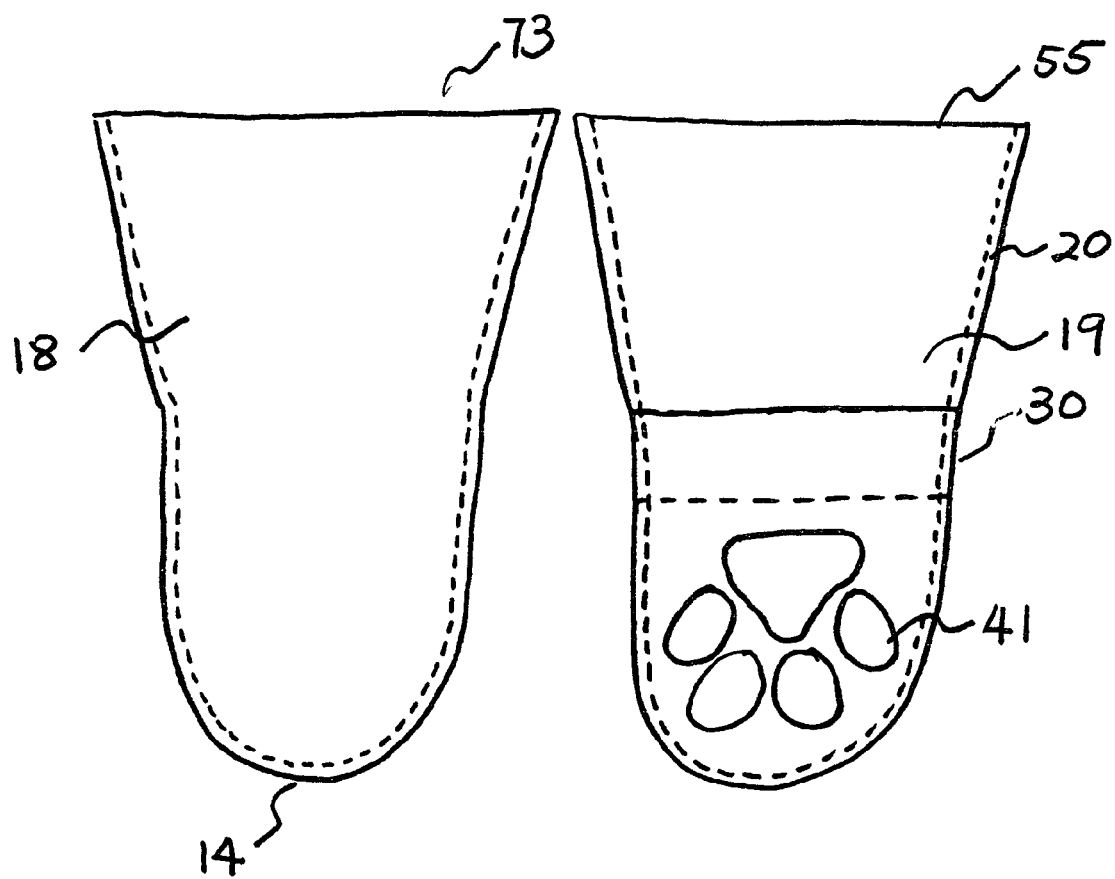
FIG. 10 is a top plan view of a cut out blank of material prior to folding to form the protective bootie of FIGS. 8 and 9.

FIG. 10 illustrates a suitable blank 73 for forming the sleeve of the protective bootie in FIGS. 8 and 9. This is formed by cutting two separate sheets of appropriate shape and dimension for forming the front and rear walls 18 and 19. A transverse fold 30 is formed across the width of the sheet which comprises the rear wall 19 of the finished sleeve, which separates the paw section 60 from the leg section 61. In this exemplary embodiment, the leg section 61 has the shape of a trapezoid with the longer base at the upper open end 55 and the shorter base 56 connected to the paw section 60.

The material selected for sleeve 12 is a relatively lightweight, inexpensive, moisture resistant material, which in one embodiment is strong and water resistant. In other embodiments, while not being water resistant, the material is particle-resistant. The material is preferably inexpensive and could also be biodegradable so that the booties can be bought in large quantities and discarded after use. One suitable material is a laminate comprising a spun bonded polypropylene layer laminated to or co-extruded with a layer of polyethylene with a non skid coating for forming the outer surface of the sleeve. Other suitable non-skid materials include vinyl latex, neoprene or silicone. These materials are available from several manufacturers. Skid-resistance is useful when an animal is walking on slippery or icy surfaces. Other suitable materials are polyvinyl chloride (PVC) or the like.

TABLE 1

| Size | A Paw Width | B Paw Length & bottom elastic | Weight | C Total Bootie Length | Dog Type | D Paw Height |
| --- | --- | --- | --- | --- | --- | --- |
| XX-small | 1." | 1.5-" | 2-5 lbs | 3.5" | Chihuahua/Pomeranian/ Yorkshire Terrier/Pug/Young Puppies/Tea Cup Poodle | 1" |
| X Small | 1.5" | 2" | 10-15 lbs | 5.5" | Silky Terrier/Japanese Chin/Maltese/Poodle/Pug/ French Bulldog/Miniature Pincher/Pug/ | 1" |
| Small | 2" | 2.5" | 20-40 lbs | 6" | Cocker Spaniel/Miniature Poodle/Toy Poodle/ Norfolk Terrier/Shi Tzu/Whippet/Miniature Pincher/Daschund | 1.5" |
| Medium | 2.5" | 3.3" | 40-50 lbs | 7" | Cocker Spaniel/Chow Chow/Standard Poodle/Beagle/Bull Dog/Dalmatian/Fox Terrier/Doberman/ | 2" |
| Large | 3" | 3.75' | 50-70 | 8" | Golden Retriever/German Shephard/Bulldog/Doberman/ Basset Hound/Bloodhound/Husky/ Irish Setter/Rottweiler/ | 2.25" |

TABLE 1-continued

| Size | | | | | | |
|---|---|---|---|---|---|---|
| X Large | 3.5" | 4.5" | 70-90 | 9.5" | Akita/Weimaraner Labrador Retriever/Golden Retriever/Siberian Husky/Irish Wolfhound | 2.5" |
| XX Large | 4" | 5.5" | 90 plus | 12" | Bullmastif/Great Dane/saint Bernard/Irish Setter/Husky/Akita | 2.5" |

| Size | Scale, using the Paw width | E Top Elastic total length when relaxed | F Tope elastic total length when stretched | G Lower loop elastic length when relaxed | H Lower loop elsatic when stretehed |
|---|---|---|---|---|---|
| XX-small | XX Small 1"-1.5" | 1" | 2" | 2" | 4" |
| X Small | X Small 1.5"-2" | 2" | 4" | 2.5" | 5" |
| Small | Small 2"-2.5" | 3" | 6" | 3" | 6" |
| Medium | Medium 2.5"-3" | 4" | 8" | 3.5" | 7" |
| Large | Large 3"-3.5" | 5" | 10" | 4" maybe a little less | 8" |
| X Large | X Large 3.5"-4" | 6" | 12" | 4.5" | 9" |
| XX Large | XX Large 4+" | 7" | 14" | 5" | 10" |

In one embodiment, the outer surface includes a non-skid layer in the shape of a paw print 41, which may be made of latex. In another embodiment, the bootie includes a reinforced toe. In yet another embodiment, the bootie includes a reflective strip or member attached thereto.

The disposable booties of this invention are particularly useful for animals such as dogs which often go outside on walks or the like, regardless of weather conditions. The booties are easy to secure over the animal's paws, simply by sliding the sleeve over the paw and then stretching the elastic loop 16 around the leg and sleeve to hold the bootie in place to provide protection from elements in the environment. An animal wearing the booties may have their paws protected from hot surfaces such as pavements or beaches in summer and from cold or icy surfaces in winter. The paws are also kept clean and protected even if walking on muddy or wet surfaces, or in snow.

The booties may also provide some protection against rough terrain, debris, allergens leaves, and seed pods which may otherwise stick to the animal's fur and cause discomfort, requiring removal by the owner after the walk. Some protection against non-naturally occurring environmental elements, such as chemicals, glass shards, or the like which may be encountered during a walk is also provided. On return from the walk or other time spent outside, the booties can simply be removed and discarded before the animal enters the home, avoiding potential soiling of indoor surfaces by wet, soiled or muddy paws.

Another advantage of the booties of this invention is that they can be used to protect a sore or injured paw to reduce discomfort to the animal, and to protect a bandaged paw or a paw to which medication such as an antimicrobial ointment, powder, or a moisturizer, has been applied. This helps to keep the ointment on the affected area for a longer period, because the animal is most likely unable to lick it off, and also prevents the ointment from being spread onto other surfaces. In one example of the invention, a plurality of booties could be packaged together with a tube of ointment or moisturizer, for convenient use by an animal owner in treating or moisturizing the animal's paws over an extended period of time.

Although an exemplary embodiment of the invention has been described above by way of example only, it is understood by those skilled in the field that modifications may be made to the disclosed embodiment without departing from the scope of the invention.

What is claimed is:

1. A protective bootie for an animal comprising:
a sleeve having a closed end and an open end for receiving a paw of the animal, wherein the sleeve further comprises a front panel and a rear panel, each extending from the closed end to the open end, and each having a trapezoidal leg section and a paw section; and
an elastic loop having an inner end attached to the sleeve at a predetermined distance front the open end of the sleeve and projecting outwardly from the sleeve, wherein the loop is adapted to the leg of the animal by looping around the leg at least once; and
an elastic strip attached in proximity to and surrounding the open end of the sleeve, whereby the elastic strip is adapted to the size of the leg of the animal for further securing the sleeve to the leg of the animal;
wherein the leg section has an upper open end and a lower end connected to the paw section and wherein the upper open end of the leg section is wider than the lower end when the elastic strip is fully extended.

2. The protective bootie of claim 1, wherein the sleeve is made of pliable, disposable material.

3. The protective bootie of claim 1, wherein the rear panel has an ankle pleat that separates the paw section from the leg section of the sleeve, whereby the ankle pleat forms a bend when the bootie is secured to the leg of the animal.

4. The protective bootie of claim 1, wherein the paw section of the rear panel further includes a secondary layer.

5. The protective bootie of claim 4, wherein the secondary layer is a non-skid layer attached to the exterior surface of the paw section.

6. The protective bootie of claim 4, wherein the secondary layer is textured.

7. The protective bootie of claim 4, wherein the secondary layer is textured with a paw print.

8. The protective bootie of claim 4, wherein the secondary layer is a reinforced layer that is attached to either the interior or exterior surface of the paw section.

9. The protective bootie of claim 8, wherein the reinforced layer is made of heat resistant material.

10. The protective bootie of claim 1, further comprising an inner layer impregnated with a moisturizer, fragrance, pharmaceutical, or a combination thereof.

* * * * *